US012643478B2

(12) United States Patent
Kaddouh

(10) Patent No.: US 12,643,478 B2
(45) Date of Patent: Jun. 2, 2026

(54) RUNNING BOARD ASSEMBLY FOR A VEHICLE

(71) Applicant: NISSAN NORTH AMERICA, INC., Franklin, TN (US)

(72) Inventor: Sam Kaddouh, West Bloomfield, MI (US)

(73) Assignee: NISSN NORTH AMERICA, INC., Franklin, TN (US)

( * ) Notice: Subject to any disclaimer, the term of this patent is extended or adjusted under 35 U.S.C. 154(b) by 266 days.

(21) Appl. No.: 18/499,130

(22) Filed: Oct. 31, 2023

(65) Prior Publication Data

US 2025/0136000 A1      May 1, 2025

(51) Int. Cl.
*B60R 3/00* (2006.01)

(52) U.S. Cl.
CPC ................................... *B60R 3/002* (2013.01)

(58) Field of Classification Search
CPC .. B60R 3/002; B62D 29/008; B23K 2103/10; B21C 23/085; B21C 23/142
See application file for complete search history.

(56) References Cited

U.S. PATENT DOCUMENTS

| | | | |
|---|---|---|---|
| 4,257,620 A | 3/1981 | Okland | |
| 6,123,378 A * | 9/2000 | Teply | B62D 23/005 |
| | | | 296/205 |
| 6,293,618 B1 * | 9/2001 | Sukegawa | B62D 29/008 |
| | | | 296/205 |
| 6,588,782 B2 * | 7/2003 | Coomber | B60R 3/002 |
| | | | 280/169 |

| | | | |
|---|---|---|---|
| 7,334,807 B2 * | 2/2008 | Mulder | B21C 23/142 |
| | | | 280/169 |
| 7,380,806 B2 | 6/2008 | Mulder | |
| 7,819,412 B2 | 10/2010 | McPherson | |
| 8,016,309 B2 * | 9/2011 | Flajnik | B60R 3/002 |
| | | | 280/169 |
| 8,424,912 B2 * | 4/2013 | Favaretto | B62D 23/005 |
| | | | 296/205 |
| 8,657,318 B2 | 2/2014 | Chen | |
| 9,399,431 B2 | 7/2016 | Crandall et al. | |
| 11,518,311 B2 | 12/2022 | Kaddouh | |
| 11,975,687 B2 * | 5/2024 | Dellock | B60R 3/00 |
| 2020/0130762 A1 | 4/2020 | Crandall | |
| 2023/0068729 A1 * | 3/2023 | Schuling | B60R 3/002 |

FOREIGN PATENT DOCUMENTS

| | | | | |
|---|---|---|---|---|
| CA | 3060796 A1 | 4/2020 | | |
| CN | 111791802 A | * 10/2020 | ............ | B60R 3/002 |
| DE | 29900510 U1 | 8/1999 | | |
| DE | 202008008321 U1 | * 8/2008 | ............ | B62D 25/00 |

OTHER PUBLICATIONS

Phillips, David H. Welding Engineering—An Introduction—7. Design Considerations for Welding.John Wiley & Sons. Retrieved from: https://app.knovel.com/hotlink/pdf/id:kt011UNW12/welding-engineering-an/design-considerations (Year: 2016).*

* cited by examiner

*Primary Examiner* — Steve Clemmons
(74) *Attorney, Agent, or Firm* — Spencer Fane LLP

(57)      ABSTRACT

A running board assembly for a vehicle includes a body member, a first end member, and a second end member. The body member has a first end and a second end. The first end member is connected to the first end of the body member. The second end member is connected to the second end of the body member. The body member is formed by extrusion. The first and second end members are formed by die casting.

17 Claims, 6 Drawing Sheets

RUNNING BOARD ASSEMBLY FOR A VEHICLE

BACKGROUND

Technical Field

The present disclosure generally relates to a running board assembly for a vehicle. More specifically, the present disclosure relates to a running board assembly in which a body member is formed by a first process, and an end member is formed by a second process.

Background Information

A vehicle is provided with a running board to facilitate entering and exiting the vehicle.

SUMMARY

An object of the present disclosure is to provide a running board assembly for a vehicle.

In view of the state of the known technology, one aspect of the present disclosure is to provide a running board assembly for a vehicle. The running board assembly includes a body member, a first end member, and a second end member. The body member has a first end and a second end. The first end member is connected to the first end of the body member. The second end member is connected to the second end of the body member. The body member is formed by extrusion. The first and second end members are formed by die casting.

Also other objects, features, aspects and advantages of the disclosed running board assembly for a vehicle will become apparent to those skilled in the art from the following detailed description, which, taken in conjunction with the annexed drawings, discloses exemplary embodiments of the running board assembly for a vehicle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figures 1, 2:
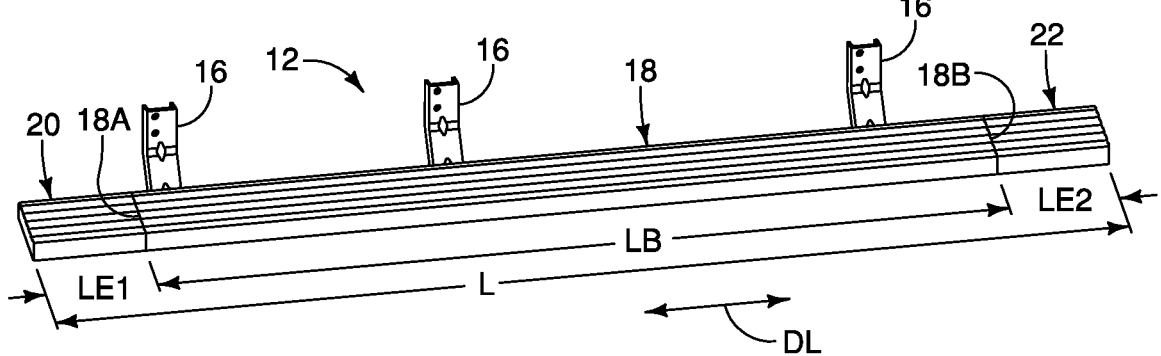
FIG. 1 is an perspective view of a running board assembly in accordance with an exemplary embodiment attached to a vehicle.
FIG. 2 is a perspective view of the running board assembly of FIG. 1.

Referring initially to FIGS. 1 and 2, a vehicle 10 includes a running board assembly 12 in accordance with an exemplary embodiment. The vehicle 10 has a vehicle body structure 14. The running board assembly is connected to the vehicle body structure 14, such as to an underside of the vehicle 10, by at least one bracket member 16. Although only shown on a driver side of the vehicle 10, a running board assembly can be connected to a passenger side of the vehicle 10.

The running board assembly 12 includes a body member 18, a first end member 20, and a second end member 22, as shown in FIG. 2. The body member 18 has a first end 18A and a second end 18B. The first end member 20 is connected to the first end 18A of the body member 18. The second end member 22 is connected to the second end 18B of the body member 18. The first and second end members 20 and 22 can be connected to the first and second ends 18A and 18B, respectively, of the body member 18 in any suitable manner, such as by welding.

The running board assembly 12 has a length L, as shown in FIG. 2. The body member 18 has a length LB. The first end member 20 has a length LE1. The second end member 22 has a length LE2. The length LB of the body member 18 is greater than the length LE1 of the first end member 20. The length LB of the body member 18 is greater than the length LE2 of the second end member 22. The length LE1 of the first end member 20 is preferably substantially equal to the length LE2 of the second end member 22. Alternatively, the length LE1 of the first end member 20 is larger or smaller than the length LE2 of the second end member 22.

Figure 6:
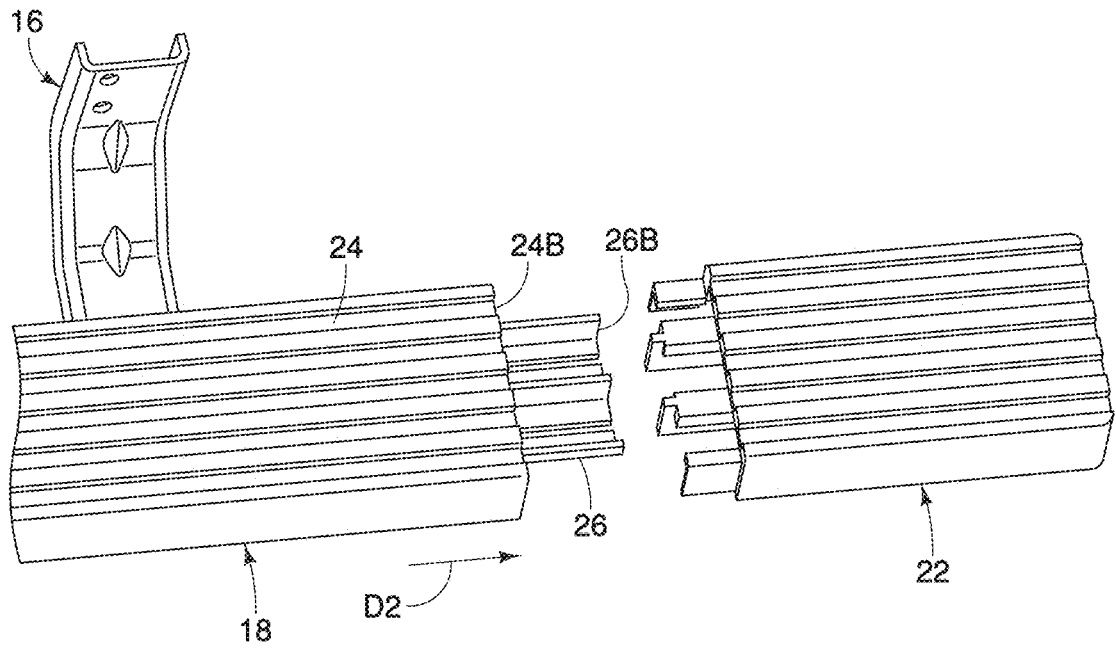
FIG. 6 is a perspective view of the running board assembly of FIG. 2 prior to connecting an end member to a body member.
Figure 8:
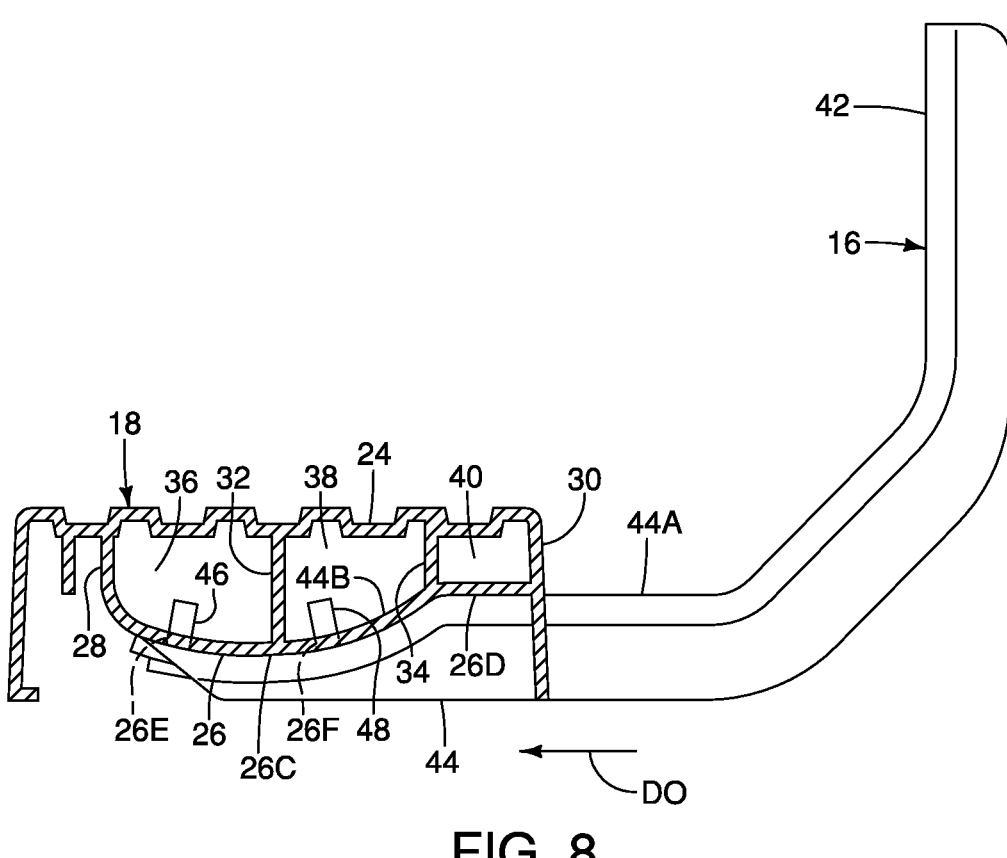
FIG. 8 is an elevational view in cross section of the running board assembly of FIG. 2.
Figure 11:
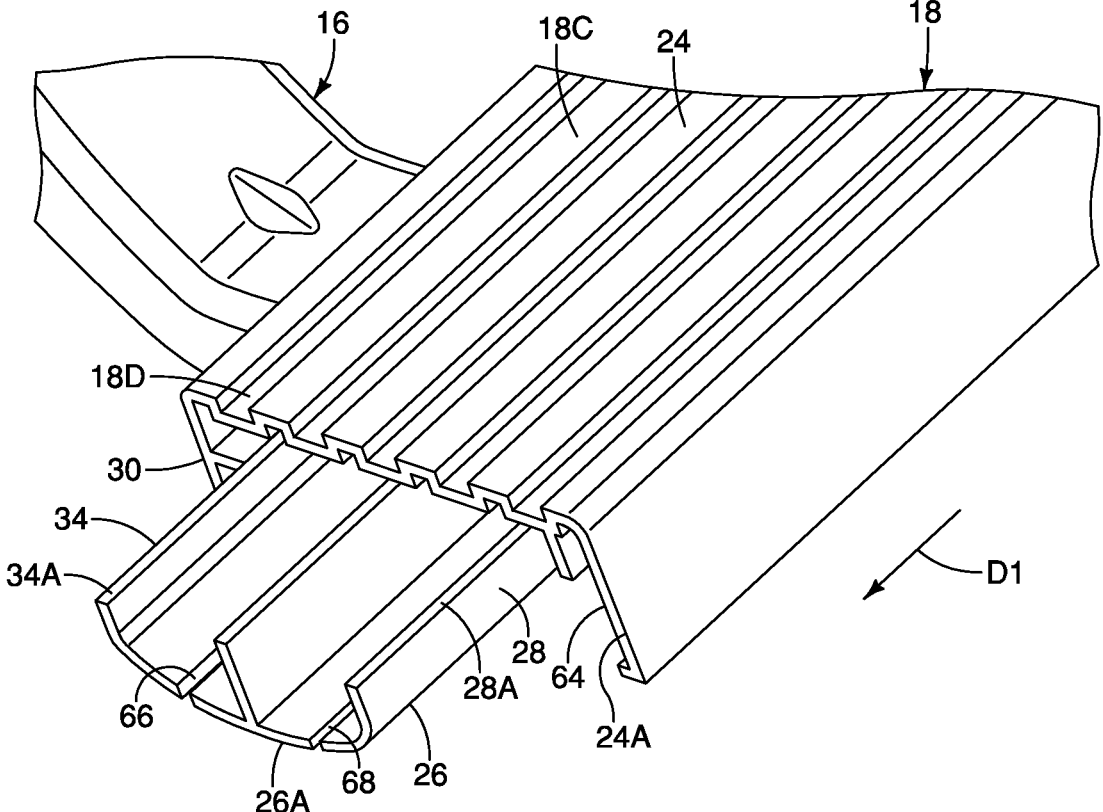
FIG. 11 is a perspective view of a body member of the running board assembly of FIG. 2.

The body member 18 has an upper wall 24 and a lower wall 26, as shown in FIGS. 6, 8 and 11. The upper wall 24 has the length LB, as shown in FIG. 2. A first end 26A of the lower wall 26 extends farther in the first direction D1 than the upper wall 24, as shown in FIG. 11. A second end 26B of the lower wall 26 extends farther in the second direction D2 than the upper wall 24, as shown in FIG. 6. The first and second ends 26A and 26B extend farther than the upper wall 24 in the first and second directions D1 and D2, respectively, to facilitate connecting the first and second end members 20 and 22. The first and second directions D1 and D2 extend in a longitudinal direction DL of the vehicle 10, as shown in FIGS. 2, 6 and 11.

A first external wall 28 connects the lower wall 26 to the upper wall 24, as shown in FIG. 8. The first external wall 28 connects an outer portion of the lower wall 26 to the upper wall 24. A second external wall 30 connects the lower wall 26 to the upper wall 24. The second external wall 30 connects an inner portion of the lower wall 26 to the upper wall 24. The first external wall 28 is disposed outwardly from the second external wall 30 in a vehicle outboard direction DO. The first and second external walls 28 and 30 extend in the longitudinal direction DL (FIG. 2).

A first internal wall 32 connects the lower wall 26 to the upper wall 24. A second internal wall 34 connects the lower wall 26 to the upper wall 24. The first internal wall 32 is disposed outwardly from the second internal wall 34 in the vehicle outboard direction DO. The first and second internal walls 32 and 34 extend in the longitudinal direction DL (FIG. 2). The first and second internal walls 32 and 34 provide additional rigidity to the body member 18.

The first external wall 28 and the first internal wall 32 define a first longitudinally extending channel 36 in the body member 18, as shown in FIG. 8. The first external wall 28, the first internal wall 32, the upper wall 24 and the lower wall 36 define and enclose the first longitudinally extending channel 36 when viewed in the longitudinal direction of the vehicle, as shown in FIG. 8.

The first internal wall 32 and the second internal wall 34 define a second longitudinally extending channel 38 in the body member 18, as shown in FIG. 8. The first internal wall 32, the second internal wall 34, the upper wall 24 and the lower wall 26 define and enclose the second longitudinally extending channel 38 when viewed in the longitudinal direction of the vehicle, as shown in FIG. 8.

The second internal wall 34 and the second external wall 30 define a third longitudinally extending channel 40 in the body member 18, as shown in FIG. 8. The second internal wall 34, the second external wall 30, the upper wall 24 and the lower wall 26 define and enclose the third longitudinally extending channel 40 when viewed in the longitudinal direction of the vehicle, as shown in FIG. 8.

The first longitudinally extending channel 36 is disposed outward from the second longitudinally extending channel 38 in the vehicle outboard direction DO, as shown in FIG. 8. The second longitudinally extending channel 38 is disposed outward from the third longitudinally extending channel 40 in the vehicle outboard direction DO. A first cross sectional area of the first longitudinally extending channel 36 is larger than a second cross sectional area of the second longitudinally extending channel 38, as shown in FIG. 8. A third cross sectional area of the third longitudinally extending channel 40 is less than each of the first and second cross sectional areas of the first and second longitudinally extending channels 36 and 38.

The lower wall 26 extends between the first external wall 28 and the second external wall 30, as shown in FIG. 8. The lower wall 26 includes a first longitudinally extending portion 26C and a second longitudinally extending portion 26D. The first longitudinally extending portion 26C is arcuate in cross section. The second longitudinally extending portion 26D is substantially planar in cross section. A width of the first longitudinally extending portion 26C is larger than a width of the second longitudinally extending portion 26D.

The running board assembly 12 is connected to the vehicle 10 by a plurality of bracket members 16, as shown in FIGS. 1-8 and 11. As shown in FIG. 1, three bracket members 16 connect the body member 18 to the vehicle 10, although any suitable number of bracket members 16 can be used.

Figure 7:
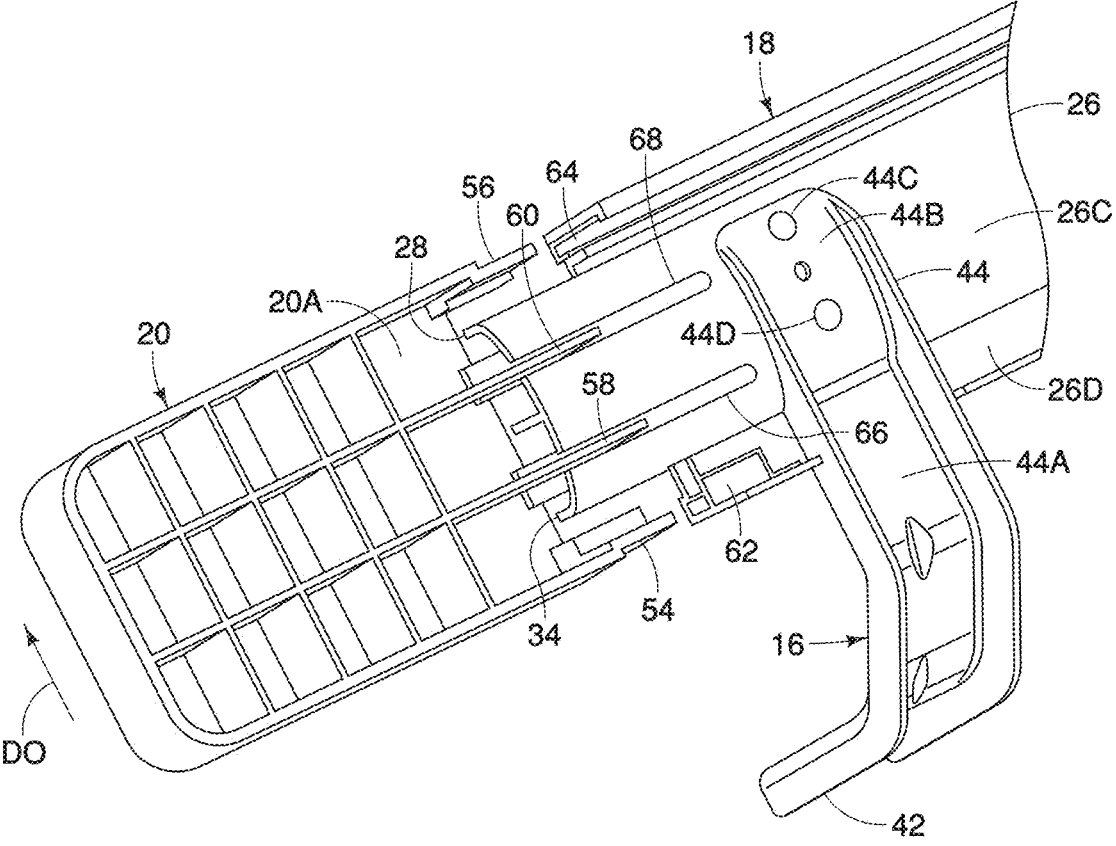
FIG. 7 is a lower perspective view of the running board assembly of FIG. 2 during connection of an end member to a body member.
Figure 9:
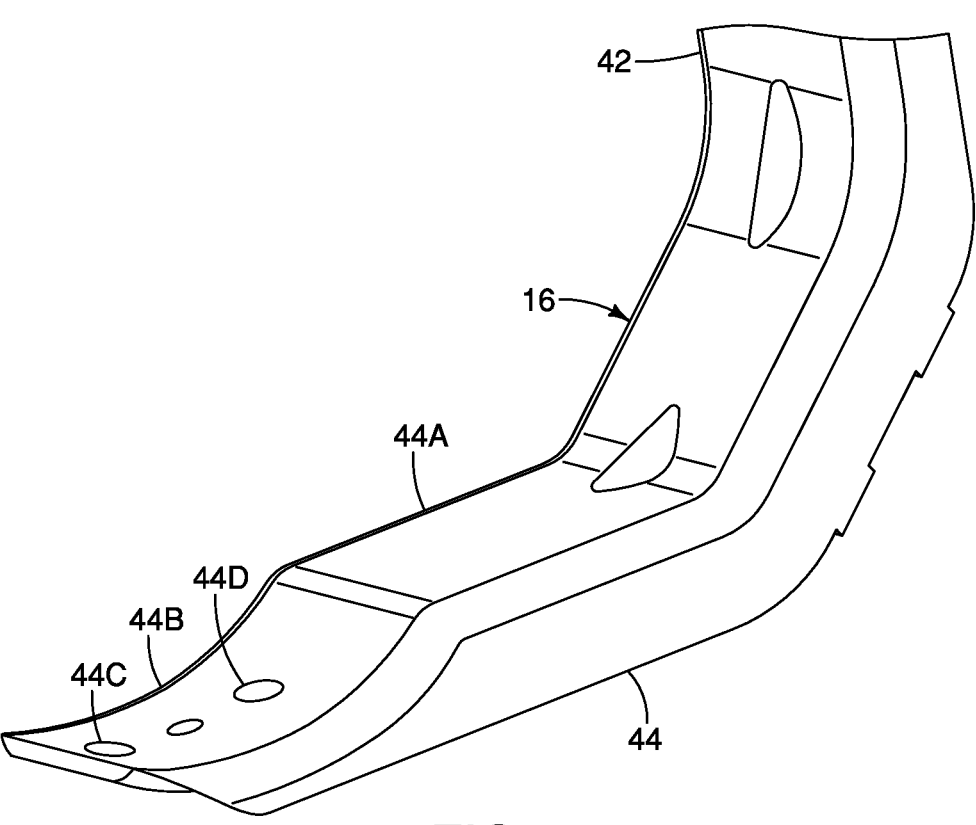
FIG. 9 is a perspective view of a bracket member of the running board assembly of FIG. 2.

The bracket member 16 is configured to secure the body member 18 to the vehicle 12, as shown in FIG. 1. The bracket member 16, as shown in FIGS. 7-9, includes a vehicle connecting portion 42 and a body member connecting portion 44. The vehicle connecting portion 42 is configured to connect the bracket member 16 to the vehicle 10 in any suitable manner. The body member connecting portion 44 is configured to connect the bracket member 16 to the body member 18 of the running board assembly 12.

The body member connecting portion 44 includes a first portion 44A and a second portion 44B, as shown in FIGS. 8 and 9. An upper surface of the first portion 44A is substantially planar. An upper surface of the second portion 44B is substantially arcuate. A plurality of fastener holes extend through the second portion 44B of the body member connecting portion 44. As shown in FIGS. 7 and 9, the bracket member 16 includes a first fastener hole 44C and a second fastener hole 44D, although any suitable number of fastener holes can be used. The first and second fastener holes 44C and 44D are disposed in the second portion 44B of the body member connecting portion 44. The first fastener hole 44C is disposed laterally outward of the second fastener hole 44D in the vehicle outboard direction DO.

The lower surface of the second longitudinally extending surface 26D of the body member 18 contacts the upper surface of the first portion 44A of the body member connecting portion 44 when the bracket member 16 is connected to the body member 18, as shown in FIG. 8. The lower surface of the first longitudinally extending portion 26C of the body member 18 contacts the upper surface of the second portion 44B of the body member connecting portion 44 when the bracket member 16 is connected to the body member 18.

The plurality of fastener holes 44C and 44D in the second portion 44B of the body member connecting portion 44 are aligned with a plurality of fastener holes 26E and 26F in the first longitudinally extending portion 26C of the body member 18 to receive first and second fasteners 46 and 48 to secure the bracket member 16 to the body member 18. The first and second fastener holes 26E and 26F are disposed in the first longitudinally portion 26C of the lower wall 26, as shown in FIG. 8. The first fastener hole 26E is disposed laterally outward of the second fastener hole 26F in the vehicle outboard direction DO. The first fastener 46 is received by the first fastener hole 26E in the first longitudinally extending portion 26C and by the first fastener hole 44C in the second portion 44B. The second fastener 48 is received by the second fastener hole 26F in the first longitudinally extending portion 26C and by the second fastener hole 44D in the second portion 44B. An end of the first fastener 46 is disposed in the first longitudinally extending channel 36, as shown in FIG. 8. An end of the second fastener 48 is disposed in the second longitudinally extending channel 38.

Figure 4:
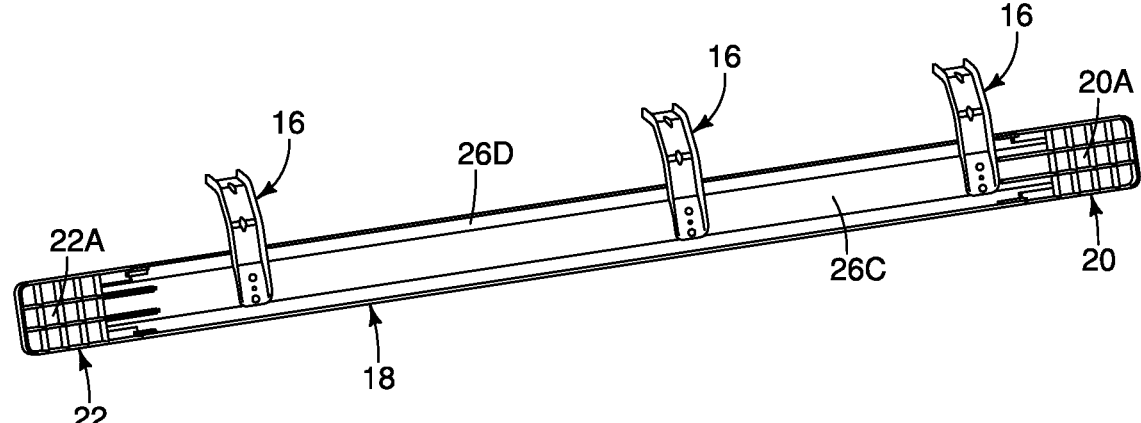
FIG. 4 is lower perspective view of the running board assembly of FIG. 2.
Figure 5:
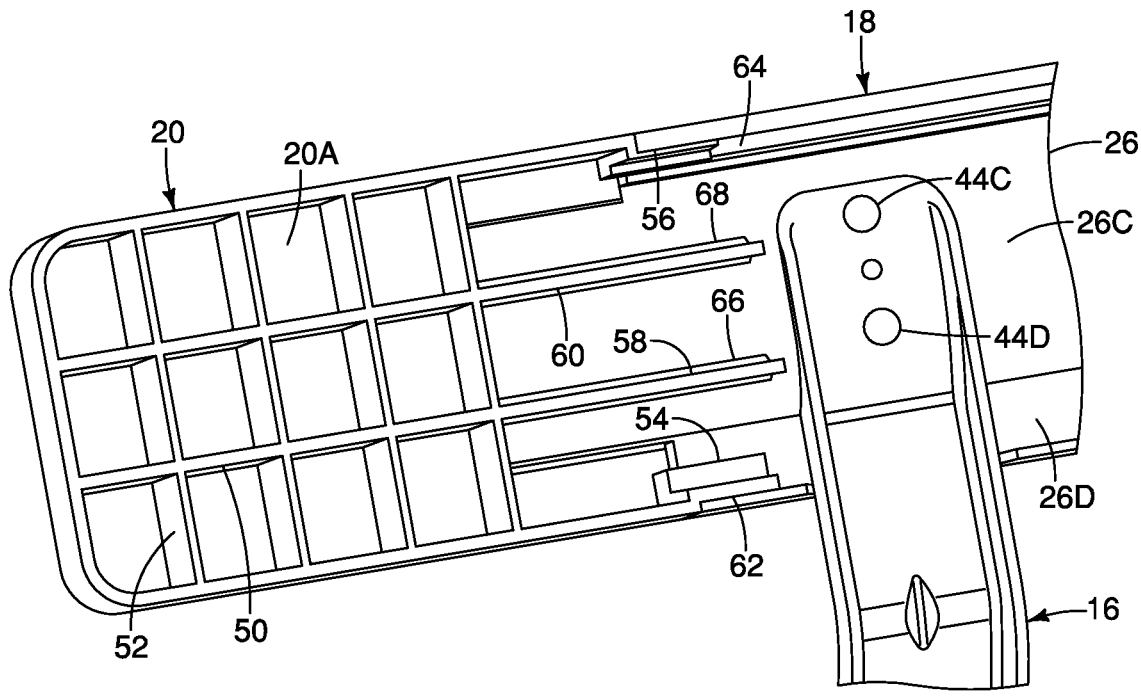
FIG. 5 is a partial lower perspective view of an end member connected to a body member of the running board assembly of FIG. 2.

The first end member 20 is connected to the first end 18A of the body member 18, and the second end member 22 is connected to the second end 18B of the body member 18, as shown in FIG. 2. A web is disposed on a lower surface of each of the first and second end members 20 and 22, as shown in FIGS. 4 and 5. As shown in FIG. 5, the web is disposed on a lower surface 20A of the first end member 20. The web includes a plurality of intersecting longitudinally extending walls 50 and laterally extending walls 52. A similarly configured web is disposed on a lower surface 22A of the second end member 22, as shown in FIG. 4. The web provides rigidity to the first and second end members 20 and 22.

Figure 10:
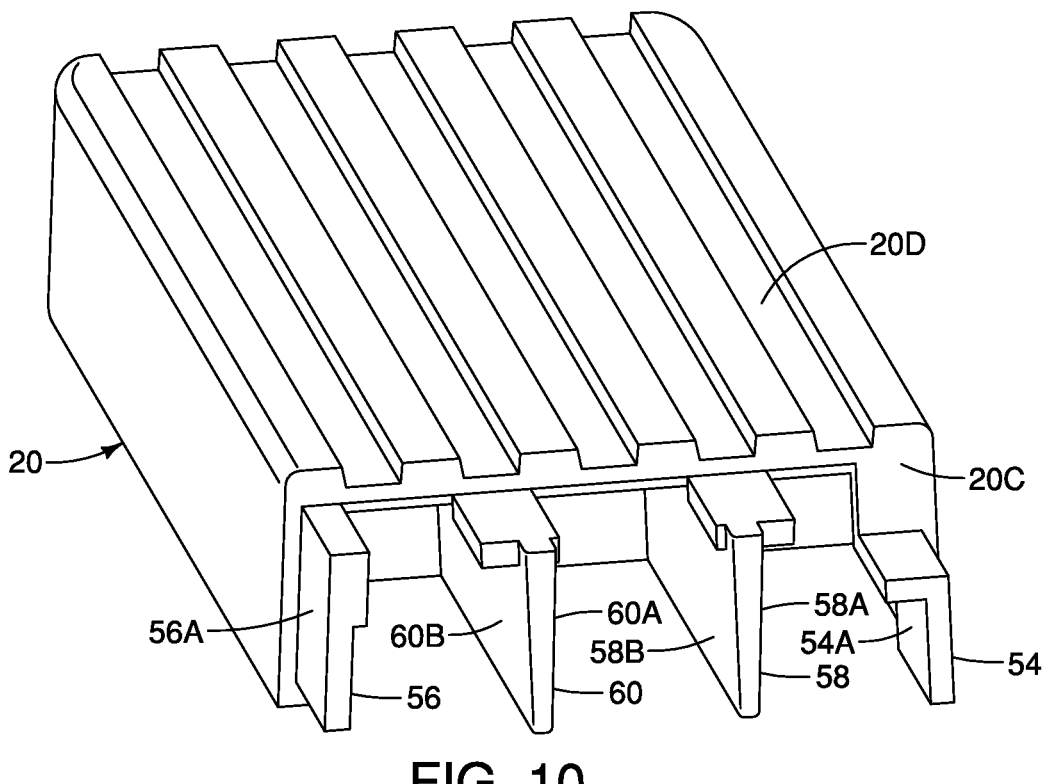
FIG. 10 is a perspective view of an end member of the running board assembly of FIG. 2.

First and second outer ribs 54 and 56 extend longitudinally outward from an end 20C of the first end member 20, as shown in FIGS. 5, 7 and 10. First and second inner ribs 58 and 60 extend longitudinally from the end 20C of the first end member 20. As shown in FIGS. 5 and 7, each of the ribs 54, 56, 58 and 60 is received by a corresponding groove in the body member 18. The first outer rib 54 is received by a first groove 62 in the body member 18. The second outer rib 56 is received by a second groove 64 in the body member 18.

The first inner rib 58 is received by a third groove 66 in the body member 18. The second inner rib 60 is received by a fourth groove 68 in the body member 18. The first and second outer ribs 54 and 56 are welded to the body member 18, preferably by fillet welding. The first and second inner ribs 58 and 60 are welded to the body member 18, preferably by fillet welding.

A first side 54A of the first outer rib 54 is welded to the portion of the body member 18 forming the first groove 62, preferably by fillet welding, as shown in FIGS. 5 and 10. A first side 56A of the second outer rib 56 is welded to the portion of the body member 18 forming the second groove 64.

First and second sides 58A and 58B of the first inner rib 58 are welded to the portion of the body member 18 forming the third groove 66, as shown in FIGS. 5 and 10. First and second sides 60A and 60B of the second inner rib 60 are welded to the portion of the body member 18 forming the fourth groove 68. The third and fourth grooves 66 and 68 are formed in the lower wall 26 of the body member 18.

The lower surface 20A of the first end member 20 is welded to the body member 18, preferably by fillet welding, as shown in FIGS. 5, 7 and 10. As shown in FIGS. 6 and 11, a portion of the lower wall 26 at each end of the body member 18 extends beyond the upper wall 24. As shown in FIG. 11, a first end 26A of the lower wall 26 extends farther in the first direction D1 than a first end 24A of the upper wall 24. As shown in FIG. 6, a second end 26B of the lower wall 26 extends farther in the second direction D2 than a second end 24B of the upper wall 24.

The extending portion of the lower wall 26 receives the first and second ribs 58 and 60 of the first end member 20. The upper surface 28A of the first external wall 28 and the upper surface 34A of the second internal wall 34 are welded to the lower surface 20A of the first end member 20. All welding surfaces are on an underside of the running board assembly 12, such that none of the welding surfaces is visible to a person using the running board assembly 12 to enter and exit the vehicle 10. The length LE1 of the first end member 20 is longer than a distance between the first end 24A of the upper wall 24 and the first end 26A of the lower wall 26, as shown in FIGS. 2 and 11. The length LE2 of the second end member 22 is longer than a distance between the second end 24B of the upper wall 24 and the second end 26A of the lower wall 26, as shown in FIGS. 2 and 6.

Figure 3:
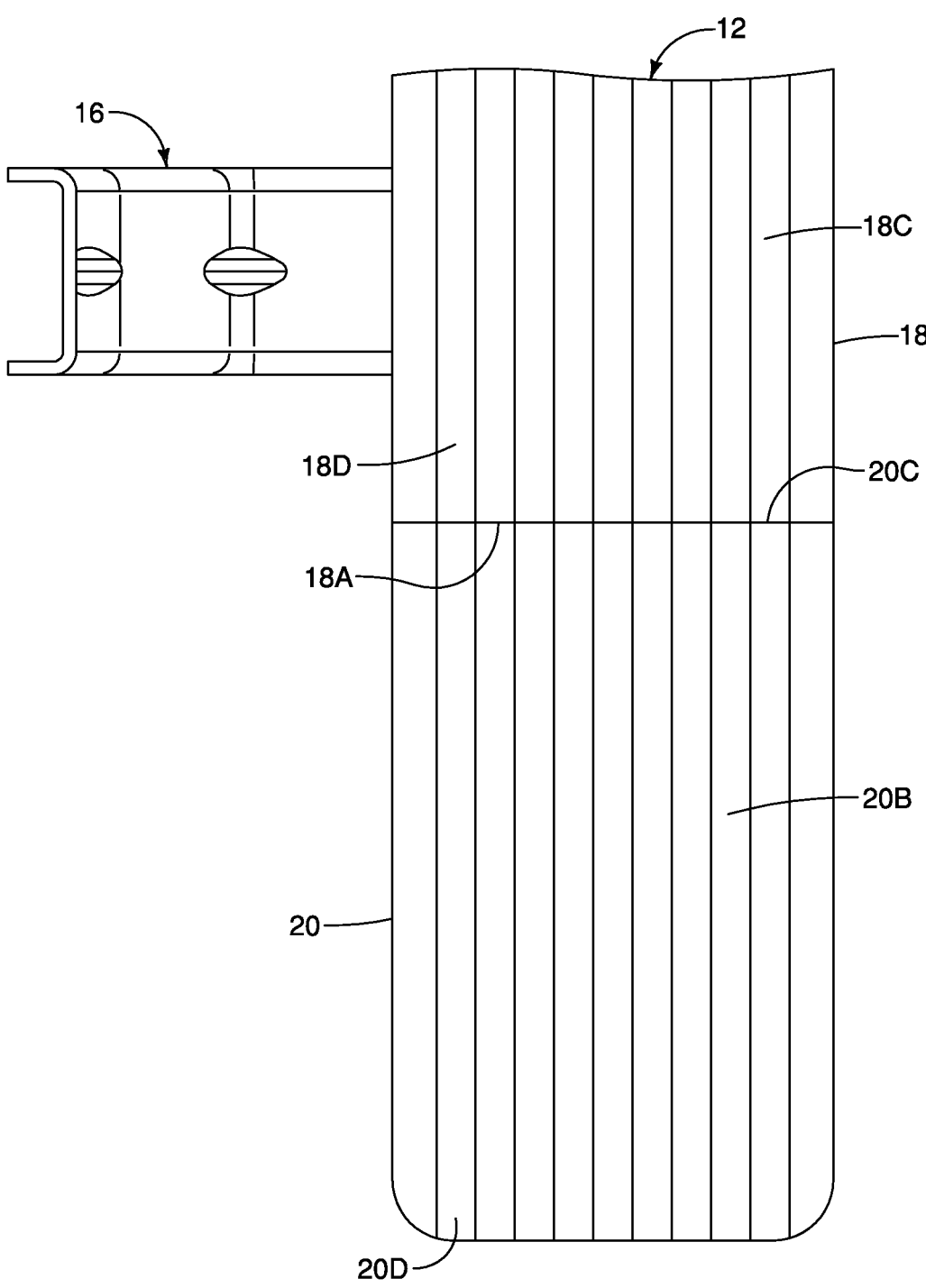
FIG. 3 is a partial top plan view of an end member connected to a body member of the running board assembly of FIG. 2.

As shown in FIG. 3, an upper surface 20B of the first end member 20 is substantially flush with an upper surface 18B of the body member 18. The first end 18A of the body member 18 contacts the end 20C of the first end member 20 when the first end member 20 is connected to the body member 18. As shown in FIGS. 10 and 11, the upper surfaces 18C and 20B of the body member 18 and the first end member 20 include a plurality of longitudinally extending grooves 18D and 20D. The longitudinally extending grooves 18D and 20D extend continuously along the length of the running board assembly 12 when the first end member 20 is connected to the body member 18.

The second end member 22 is configured similarly to the first end member 20. The second end member 22 is connected to the body member 18 in substantially the same manner as the first end member 20.

The body member 18 is formed by a first process, such as extrusion. The first and second end members 20 and 22 are formed by a second process, such as die casting. The second process is different from the first process. The extrusion process provides a strong and light weight body member 18. The die casting process allows for a wide range of shapes for the first and second end members 20 and 22, in addition to allowing for a logo to be imprinted thereon. The upper wall 24 of the body member 18 is trimmed at both ends after extrusion to form the extension portion of the lower wall 26, as shown in FIGS. 6 and 11. In other words, the upper wall 24 is trimmed such that the first and second ends 26A and 26B of the lower wall 26 extend farther than the first and second ends 24A and 24B, respectively, of the upper wall 24 in the first and second longitudinal directions L1 and L2, as shown in FIGS. 6 and 11.

After connecting the first and second end members 20 and 22 to the body member 18, a powder coating is applied to all surfaces of the body member 18, the first end member 20 and the second end member 22. The powder coating is fused to the surfaces. The top and side surfaces of the running board assembly 12 are then sprayed with a bedliner.

The body member 18 is made of any suitable material, such as aluminum. The first and second end members 20 and 22 are made of any suitable material, such as aluminum. The bracket member 16 is made of any suitable material, such as a high strength steel.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a running board assembly for a vehicle. Accordingly, these terms, as utilized to describe the present invention should be interpreted relative to a running board assembly for a vehicle.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A running board assembly for a vehicle comprising:
a body member having a first end and a second end;
a first end member connected to the first end of the body member;
a second end member connected to the second end of the body member; and
first and second outer ribs extending longitudinally from an end of each of the first and second end members, and first and second inner ribs extending longitudinally from the end of each of the first and second end members, the first and second outer ribs and the first and second inner ribs being welded to the body member,
a lower surface of each of the first and second end members being welded to the body member,
first and second grooves disposed in a lower wall of the body member receiving the first and second inner ribs of each of the first and second end members,
the body member being formed by extrusion, and the first and second end members being formed by die casting.

2. The running board assembly according to claim 1, wherein
the body member is made of aluminum.

3. The running board assembly according to claim 1, wherein
the first and second end members are made of aluminum.

4. The running board assembly according to claim 1, wherein
the body member includes an upper wall and the lower wall, first and second external walls connecting the lower wall to the upper wall, and first and second internal walls connecting the lower wall to the upper wall.

5. The running board assembly according to claim 4, wherein
the first external wall and the first internal wall define a first longitudinally extending channel in the body member.

6. The running board assembly according to claim 5, wherein
the first internal wall and the second internal wall define a second longitudinally extending channel in the body member.

7. The running board assembly according to claim 6, wherein the second internal wall and the second external wall define a third longitudinally extending channel in the body member.

8. The running board assembly according to claim 7, wherein
a first cross sectional area of the first longitudinally extending channel is larger than a second cross sectional area of the second longitudinally extending channel.

9. The running board assembly according to claim 8, wherein
a third cross sectional area of the third longitudinally extending channel is less than the first and second cross sectional areas of the first and second longitudinally extending channels.

10. The running board assembly according to claim 9, wherein
the lower wall includes a first longitudinally extending portion and a second longitudinally extending portion, the first longitudinally extending portion being arcuate in cross section and the second longitudinally extending portion being substantially planar in cross section.

11. The running board assembly according to claim 10, wherein
a bracket member is configured to secure the body member to the vehicle.

12. The running board assembly according to claim 11, wherein
first and second fastener holes are disposed in the first longitudinally extending portion of the lower surface, the first fastener hole being disposed laterally outward of the second fastener hole.

13. The running board assembly according to claim 12, wherein
a first fastener is received by the first fastener hole, an end of the first fastener being disposed in the first longitudinally extending channel.

14. The running board assembly according to claim 13, wherein
a second fastener is received by the second fastener hole, an end of the second fastener being disposed in the second longitudinally extending channel.

15. The running board assembly according to claim 1, wherein
a plurality of intersecting longitudinally and laterally extending walls are connected to a lower surface of each of the first and second end members.

16. The running board assembly according to claim 1, wherein
first and second sides of each of the first and second inner ribs are welded to the body member.

17. The running board assembly according to claim 1, wherein
upper surfaces of each of the first and second end members are substantially flush with an upper surface of the body member.

* * * * *